(12) United States Patent
Kawabata et al.

(10) Patent No.: US 9,079,797 B2
(45) Date of Patent: Jul. 14, 2015

(54) METHOD FOR PRODUCING POLYCARBOXYLIC ACID COPOLYMER AND COPOLYMER COMPOSITION FOR CEMENT ADMIXTURE

(75) Inventors: Hiroshi Kawabata, Kawasaki (JP); Noboru Sakamoto, Suita (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 117 days.

(21) Appl. No.: 12/992,502

(22) PCT Filed: May 8, 2009

(86) PCT No.: PCT/JP2009/058672
§ 371 (c)(1),
(2), (4) Date: Nov. 12, 2010

(87) PCT Pub. No.: WO2009/139328
PCT Pub. Date: Nov. 19, 2009

(65) Prior Publication Data
US 2011/0065847 A1    Mar. 17, 2011

(30) Foreign Application Priority Data

May 14, 2008  (JP) ................................. 2008-126684
May 15, 2008  (JP) ................................. 2008-128104

(51) Int. Cl.
| C04B 24/16 | (2006.01) |
| C08F 4/40 | (2006.01) |
| C08F 283/06 | (2006.01) |
| C08F 220/06 | (2006.01) |
| C04B 24/26 | (2006.01) |
| C08F 216/14 | (2006.01) |
| C09D 4/00 | (2006.01) |
| C04B 103/40 | (2006.01) |
| C04B 111/62 | (2006.01) |

(52) U.S. Cl.
CPC ........... *C04B 24/165* (2013.01); *C04B 24/2647* (2013.01); *C08F 4/40* (2013.01); *C08F 216/1416* (2013.01); *C08F 283/06* (2013.01); *C09D 4/00* (2013.01); *C04B 2103/408* (2013.01); *C04B 2111/62* (2013.01); *C08F 220/06* (2013.01)

(58) Field of Classification Search
CPC ............. C08K 5/42; C08F 20/06; C08F 4/40; C08F 283/06; C08F 220/06; C04B 24/165
USPC ................. 524/5, 4, 376, 158; 526/317.1, 240
See application file for complete search history.

(56) References Cited

U.S. PATENT DOCUMENTS

| 6,166,112 A | 12/2000 | Hirata et al. |
| 6,384,111 B1 | 5/2002 | Kistenmacher et al. |
| 6,569,234 B2 | 5/2003 | Yamashita et al. |
| 6,673,885 B1 | 1/2004 | Shibata et al. |
| 6,727,315 B2 | 4/2004 | Yamamoto et al. |
| 6,900,275 B2 | 5/2005 | Tomita et al. |
| 7,253,220 B2 * | 8/2007 | Yamashita et al. ................. 524/5 |
| 7,691,921 B2 | 4/2010 | Asano et al. |
| 2002/0050232 A1 * | 5/2002 | Yamashita et al. ............ 106/802 |
| 2002/0055559 A1 | 5/2002 | Kistenmacher et al. |
| 2002/0132946 A1 | 9/2002 | Kistenmacher et al. |
| 2003/0125492 A1 | 7/2003 | Yamamoto et al. |
| 2003/0149206 A1 | 8/2003 | Tomita et al. |
| 2004/0204517 A1 | 10/2004 | Yamashita et al. |
| 2006/0183820 A1 | 8/2006 | Asano et al. |
| 2010/0130793 A1 | 5/2010 | Yuasa et al. |

FOREIGN PATENT DOCUMENTS

| CN | 1768015 A | 5/2006 |
| JP | 2001-220417 A | 8/2001 |
| JP | 2002-121055 A | 4/2002 |
| JP | 2002-121056 A | 4/2002 |
| JP | 2002121055 A * | 4/2002 |
| JP | 2003-221266 A | 8/2003 |
| JP | 2003221266 A * | 8/2003 |
| JP | 2004-067934 A | 3/2004 |
| JP | 2006-248889 A | 9/2006 |
| JP | 2006-522734 A | 10/2006 |
| JP | 2007-119337 A | 5/2007 |
| JP | 2007-302519 A | 11/2007 |
| JP | 2007-327067 A | 12/2007 |
| JP | 2008-274258 A | 11/2008 |
| WO | 01/14438 A1 | 3/2001 |
| WO | 03/040194 A1 | 5/2003 |
| WO | 2006/129883 A1 | 12/2006 |

OTHER PUBLICATIONS

Japanese Office Action for corresponding Application No. 2009-108765 issued Oct. 9, 2013.

* cited by examiner

*Primary Examiner* — Michael M Bernshteyn
(74) *Attorney, Agent, or Firm* — Sughrue Mion, PLLC

(57) ABSTRACT

The present application relates to a production method for a polycarboxylic acid-based copolymer including a structural unit (I) derived from an unsaturated polyalkylene glycol ether-based monomer (a) and a structural unit (II) derived from an unsaturated carboxylic acid-based monomer (b), in which monomer components including the monomer (a) and the monomer (b) are polymerized using a peroxide and a reductant as polymerization initiators in combination while the pH during polymerization is controlled to 3 or less in the presence of a pH adjustor. The present application also relates to a polycarboxylic acid-based copolymer for a high-performance cement admixture including a structural unit (I) derived from an unsaturated polyalkylene glycol ether-based monomer (a) and a structural unit (II) derived from an unsaturated carboxylic acid-based monomer (b), and a nonpolymerizable organic sulfonic acid having a molecular weight of 300 or less and/or a salt thereof.

14 Claims, No Drawings

METHOD FOR PRODUCING POLYCARBOXYLIC ACID COPOLYMER AND COPOLYMER COMPOSITION FOR CEMENT ADMIXTURE

TECHNICAL FIELD

The present invention relates to a production method for a polycarboxylic acid-based copolymer, and more specifically, to a production method for a polycarboxylic acid-based copolymer suitable for a cement admixture. The present invention also relates to a copolymer composition for a cement admixture, and more specifically, to a copolymer composition suitable for a cement admixture.

BACKGROUND ART

A cement admixture is widely used for a cement composition such as cement paste, mortar, or concrete.

The use of the cement admixture can increase the fluidity of the cement composition, and can reduce water in the cement composition. The water reduction leads to improvements in strength, durability, and the like of a cured product.

In recent years, a cement admixture including a polycarboxylic acid-based copolymer as a main component has been proposed as the cement admixture. A cement admixture (polycarboxylic acid-based cement admixture) including a polycarboxylic acid-based copolymer as a main component can exhibit high water-reducing performance.

As for the polycarboxylic acid-based copolymer capable of exhibiting high water-reducing performance in the case of being used for the cement admixture, there is known a polycarboxylic acid-based copolymer including a structural unit derived from an unsaturated polyalkylene glycol ether-based monomer and a structural unit derived from an unsaturated carboxylic acid-based monomer (see Patent Literatures 1 to 9).

However, there is a problem in that the unsaturated polyalkylene glycol ether-based monomer has low copolymerization property as compared to a corresponding ester-based monomer, for example. Therefore, in the production of the polycarboxylic acid-based copolymer including a structural unit derived from an unsaturated polyalkylene glycol ether-based monomer and a structural unit derived from an unsaturated carboxylic acid-based monomer, the following problems may arise, for example. That is, when it is intended to obtain a polycarboxylic acid-based copolymer having a desired copolymerization ratio, such copolymer cannot be obtained. Even when such copolymer is obtained, the polymer purity decreases to deteriorate polymer quality, and the production cost increases because polymerization must be performed under a low concentration condition. Further, when the polycarboxylic acid-based copolymer including a structural unit derived from an unsaturated polyalkylene glycol ether-based monomer and a structural unit derived from an unsaturated carboxylic acid-based monomer is used for a cement admixture, the performance of the cement admixture cannot be sufficiently expressed owing to the above-mentioned low copolymerization property.

Further, in the hitherto reported copolymerization methods for the production of the polycarboxylic acid-based copolymer including a structural unit derived from an unsaturated polyalkylene glycol ether-based monomer and a structural unit derived from an unsaturated carboxylic acid-based monomer, sufficient copolymerization property cannot be easily expressed for the unsaturated polyalkylene glycol ether-based monomer. Accordingly, in the production of the polycarboxylic acid-based copolymer including a structural unit derived from an unsaturated polyalkylene glycol ether-based monomer and a structural unit derived from an unsaturated carboxylic acid-based monomer, the development of a technology that allows for easy expression of sufficient copolymerization property for the unsaturated polyalkylene glycol ether-based monomer can reduce the production cost of the copolymer and can produce a polycarboxylic acid-based copolymer with which an unprecedentedly high-performance cement admixture can be provided.

CITATION LIST

Patent Literature

[Patent Literature 1] JP 2001-220417 A
[Patent Literature 2] JP 2007-119337 A
[Patent Literature 3] WO 2001/014438 A1
[Patent Literature 4] WO 2003/040194 A1
[Patent Literature 5] JP 2006-248889 A
[Patent Literature 6] JP 2007-327067 A
[Patent Literature 7] WO 2006/129883 A1
[Patent Literature 8] JP 2001-220417 A
[Patent Literature 9] JP 2002-121055 A

SUMMARY OF INVENTION

Technical Problem

An object of the present invention is to provide a production method for a polycarboxylic acid-based copolymer including a structural unit derived from an unsaturated polyalkylene glycol ether-based monomer and a structural unit derived from an unsaturated carboxylic acid-based monomer, by which the production cost of the copolymer is reduced and an unprecedentedly high-performance cement admixture can be provided. Another object of the present invention is to provide a copolymer composition for a cement admixture, including a structural unit derived from an unsaturated polyalkylene glycol ether-based monomer and a structural unit derived from an unsaturated carboxylic acid-based monomer, with which an unprecedentedly high-performance cement admixture can be provided.

Solution to Problem

A production method for a polycarboxylic acid-based copolymer of the present invention is a production method for a polycarboxylic acid-based copolymer including: a structural unit (I) derived from an unsaturated polyalkylene glycol ether-based monomer (a) represented by the general formula (1):

[Chem 1]

(in the general formula (1): Y represents an alkenyl group having 2 to 8 carbon atoms; T represents an alkylene group having 1 to 5 carbon atoms or an aryl group having 6 to 9 carbon atoms; $R^1O$ represents one kind or two or more kinds of oxyalkylene groups having 2 to 18 carbon atoms; m represents 0 or 1; n represents an average addition mole number of the oxyalkylene groups and n represents 1 to 500; and $R^2$ represents a hydrogen atom or an alkyl group having 1 to 5 carbon atoms); and a structural unit (II) derived from an unsaturated carboxylic acid-based monomer (b) represented by the general formula (2):

[Chem 2]

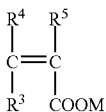

(2)

(in the general formula (2): $R^3$, $R^4$, and $R^5$ are identical to or different from each other and each represent a hydrogen atom, a methyl group, or a —COOM group; M represents a hydrogen atom, a monovalent metal atom, a divalent metal atom, an ammonium group, or an organic amine group), in which monomer components including the monomer (a) and the monomer (b) are polymerized using a peroxide and a reductant as polymerization initiators in combination while the pH during polymerization is controlled to 3 or less in the presence of a pH adjustor.

In a preferred embodiment, the above-mentioned pH adjustor includes an organic sulfonic acid and/or a salt thereof.

In a preferred embodiment, the above-mentioned peroxide includes hydrogen peroxide and the above-mentioned reductant includes L-ascorbic acid.

In a preferred embodiment, the above-mentioned copolymer includes a copolymer for a cement admixture.

A copolymer composition for a cement admixture of the present invention includes: a polycarboxylic acid-based copolymer including a structural unit (I) derived from an unsaturated polyalkylene glycol ether-based monomer (a) represented by the general formula (1):

[Chem 3]

$$YO(TO)_m(R^1O)_nR^2 \quad (1)$$

(in the general formula (1): Y represents an alkenyl group having 2 to 8 carbon atoms; T represents an alkylene group having 1 to 5 carbon atoms or an aryl group having 6 to 9 carbon atoms; $R^1O$ represents one kind or two or more kinds of oxyalkylene groups having 2 to 18 carbon atoms; m represents 0 or 1; n represents an average addition mole number of the oxyalkylene groups; n represents 1 to 500; $R^2$ represents a hydrogen atom or an alkyl group having 1 to carbon atoms), and a structural unit (II) derived from an unsaturated carboxylic acid-based monomer (b) represented by the general formula (2):

[Chem 4]

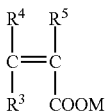

(2)

(in the general formula (2): $R^3$, $R^4$, and $R^5$ are identical to or different from each other and each represent a hydrogen atom, a methyl group, or a —COOM group; M represents a hydrogen atom, a monovalent metal atom, a divalent metal atom, an ammonium group, or an organic amine group); and a nonpolymerizable organic sulfonic acid having a molecular weight of 300 or less and/or a salt thereof.

In a preferred embodiment, the above-mentioned organic sulfonic acid includes a compound represented by the general formula (3):

$$R^6\text{—(Ph)p-SO}_3H \quad (3)$$

(in the general formula (3): $R^6$ represents a hydrogen atom or an alkyl group having 1 to 6 carbon atoms; Ph represents a phenylene group; and p represents 0 or 1).

In a preferred embodiment, the above-mentioned compound represented by the general formula (3) includes a low molecular weight compound having a molecular weight of 250 or less.

In a preferred embodiment, $R^6$ in the general formula (3) represents an alkyl group having 1 or 2 carbon atoms.

In a preferred embodiment, Y in the general formula (1) represents an alkenyl group having 4 or 5 carbon atoms.

Advantageous Effects of Invention

According to the present invention, there is provided the production method for a polycarboxylic acid-based copolymer including a structural unit derived from an unsaturated polyalkylene glycol ether-based monomer and a structural unit derived from an unsaturated carboxylic acid-based monomer, by which the production cost of the copolymer is reduced and an unprecedentedly high-performance cement admixture can be provided.

According to the present invention, there can be provided the copolymer composition for a cement admixture, including a structural unit derived from an unsaturated polyalkylene glycol ether-based monomer and a structural unit derived from an unsaturated carboxylic acid-based monomer, with which an unprecedentedly high-performance cement admixture can be provided.

DESCRIPTION OF EMBODIMENTS

<<1. Production Method for Polycarboxylic Acid-Based Copolymer>>

A production method for a polycarboxylic acid-based copolymer of the present invention is a production method for a polycarboxylic acid-based copolymer including a structural unit (I) derived from an unsaturated polyalkylene glycol ether-based monomer (a) represented by the above-mentioned general formula (1) and a structural unit (II) derived from an unsaturated carboxylic acid-based monomer (b) represented by the above-mentioned general formula (2). In the present invention, the unsaturated polyalkylene glycol ether-based monomers (a) may be used alone or in combination. In the present invention, the unsaturated carboxylic acid-based monomers (b) may be used alone or in combination.

The total content of the above-mentioned structural unit (I) and the above-mentioned structural unit (II) in the polycarboxylic acid-based copolymer obtained by the production method of the present invention is preferably 10 to 100 mass %, more preferably 20 to 100 mass %, or even more preferably 30 to 100 mass %. When the total content of the above-mentioned structural unit (I) and the above-mentioned structural unit (II) in the polycarboxylic acid-based copolymer obtained by the production method of the present invention falls within the above-mentioned range, it is possible to provide a polycarboxylic acid-based copolymer with which a high-performance cement admixture can be provided.

The content of the above-mentioned structural unit (I) in the polycarboxylic acid-based copolymer obtained by the production method of the present invention is preferably 10 to 99 mass %, more preferably 20 to 99 mass %, or even more preferably 30 to 99 mass %. When the content of the above-mentioned structural unit (I) in the polycarboxylic acid-based copolymer obtained by the production method of the present invention falls within the above-mentioned range, it is possible to provide a polycarboxylic acid-based copolymer with which a high-performance cement admixture can be provided.

The content of the above-mentioned structural unit (II) in the polycarboxylic acid-based copolymer obtained by the production method of the present invention is preferably 1 to 90 mass %, more preferably 1 to 80 mass %, or even more preferably 1 to 70 mass %. When the content of the above-mentioned structural unit (II) in the polycarboxylic acid-based copolymer obtained by the production method of the present invention falls within the above-mentioned range, it is possible to provide a polycarboxylic acid-based copolymer with which a high-performance cement admixture can be provided.

In the general formula (1), Y represents an alkenyl group having 2 to 8 carbon atoms. Y preferably represents an alkenyl group having 2 to 5 carbon atoms. Examples of the alkenyl group represented by Y include a vinyl group, an allyl group, a methallyl group, a 3-butenyl group, a 3-methyl-3-butenyl group, a 3-methyl-2-butenyl group, a 2-methyl-3-butenyl group, a 2-methyl-2-butenyl group, and a 1,1-dimethyl-2-propenyl group. Of those, an allyl group, a methallyl group, and a 3-methyl-3-butenyl group are preferred.

In the general formula (1), T represents an alkylene group having 1 to 5 carbon atoms or an aryl group having 6 to 9 carbon atoms.

In the general formula (1), m represents 0 or 1.

In the general formula (1), $R^1O$ represents one kind or two or more kinds of oxyalkylene groups having 2 to 18 carbon atoms. $R^1O$ represents preferably one kind or two or more kinds of oxyalkylene groups having 2 to 8 carbon atoms or more preferably one kind or two or more kinds of oxyalkylene groups having 2 to 4 carbon atoms. Examples of the oxyalkylene groups represented by $R^1O$ include an oxyethylene group, an oxypropylene group, an oxybutylene group, and an oxystyrene group. An addition form of $R^1O$ is, for example, random addition, block addition, or alternating addition. It should be noted that an oxyethylene group is preferably contained as an essential component in the oxyalkylene groups in order to ensure the balance between hydrophilicity and hydrophobicity. To be more specific, the oxyethylene group is contained in an amount of preferably 50 mol % or more or more preferably 90 mol % or more with respect to 100 mol % of all the oxyalkylene groups.

In the general formula (1), n represents the average addition mole number of the oxyalkylene groups and n represents 1 to 500. n represents preferably 2 to 300, more preferably 5 to 300, even more preferably 10 to 300, particularly preferably 15 to 300, or most preferably 20 to 300. When n is smaller, the hydrophilicity of the resultant polymer may decrease, resulting in a deterioration in dispersion performance. When n is more than 500, the copolymerization reactivity may decrease.

In the general formula (1), $R^2$ represents a hydrogen atom or an alkyl group having 1 to 5 carbon atoms.

In the general formula (2), $R^3$, $R^4$, and $R^5$ are identical to or different from each other and each represent a hydrogen atom, a methyl group, or a —COOM group.

M represents a hydrogen atom, a monovalent metal atom, a divalent metal atom, an ammonium group, or an organic amine group.

Any appropriate monovalent metal atom may be employed as the above-mentioned monovalent metal atom. Examples of the monovalent metal atom include lithium, sodium, and potassium.

Any appropriate divalent metal atom may be employed as the above-mentioned divalent metal atom. Examples of the divalent metal atom include divalent metal atoms such as alkaline earth metal atoms such as calcium and magnesium.

Any appropriate organic amine group may be employed as the organic amine group as long as the group is a protonated organic amine. Examples of the organic amine group include alkanolamine groups such as an ethanolamine group, a diethanolamine group, and a triethanolamine group and a triethylamine group.

Examples of the unsaturated polyalkylene glycol ether-based monomer (a) include compounds obtained by adding 1 to 500 mol of an alkylene oxide to an unsaturated alcohol such as 3-methyl-3-buten-1-ol, 3-methyl-2-buten-1-ol, 2-methyl-3-buten-2-ol, 2-methyl-2-buten-1-ol, or 2-methyl-3-buten-1-ol.

Specific examples of the unsaturated polyalkylene glycol ether-based monomer (a) include polyethylene glycol mono(3-methyl-3-butenyl)ether, polyethylene glycol mono(3-methyl-2-butenyl)ether, polyethylene glycol mono(2-methyl-3-butenyl)ether, polyethylene glycol mono(2-methyl-2-butenyl)ether, polyethylene glycol mono(1,1-dimethyl-2-propenyl)ether, polyethylene polypropylene glycol mono(3-methyl-3-butenyl)ether, methoxypolyethylene glycol mono(3-methyl-3-butenyl)ether, ethoxypolyethylene glycol mono(3-methyl-3-butenyl)ether, 1-propoxypolyethylene glycol mono(3-methyl-3-butenyl)ether, cyclohexyloxypolyethylene glycol mono(3-methyl-3-butenyl)ether, 1-octyloxypolyethylene glycol mono(3-methyl-3-butenyl)ether, nonylalkoxypolyethylene glycol mono(3-methyl-3-butenyl)ether, laurylalkoxypolyethylene glycol mono(3-methyl-3-butenyl)ether, stearylalkoxypolyethylene glycol mono(3-methyl-3-butenyl)ether, phenoxypolyethylene glycol mono(3-methyl-3-butenyl)ether, and naphthoxypolyethylene glycol mono(3-methyl-3-butenyl)ether.

Examples of the unsaturated carboxylic acid-based monomer (b) include an unsaturated monocarboxylic acid-based monomer (b-1) and an unsaturated dicarboxylic acid-based monomer (b-2). The unsaturated carboxylic acid-based monomer (b) is preferably the unsaturated monocarboxylic acid-based monomer (b-1).

Any appropriate unsaturated monocarboxylic acid-based monomer may be employed as the unsaturated monocarboxylic acid-based monomer (b-1). A preferred example of the unsaturated monocarboxylic acid-based monomer (b-1) includes a (meth) acrylic acid-based monomer. Specific examples thereof include acrylic acid, methacrylic acid, crotonic acid, and a monovalent metal salt, a divalent metal salt, an ammonium salt, and an organic amine salt thereof. From the viewpoint of copolymerization property, more preferred examples of the unsaturated monocarboxylic acid-based monomer (b-1) include (meth) acrylic acid and/or a salt (e.g., a monovalent metal salt, a divalent metal salt, an ammonium salt, or an organic amine salt) thereof, and even more preferred examples thereof include acrylic acid and/or a salt (e.g., a monovalent metal salt, a divalent metal salt, an ammonium salt, or an organic amine salt) thereof.

Any appropriate unsaturated dicarboxylic acid-based monomer may be employed as the unsaturated dicarboxylic acid-based monomer (b-2). Specific examples of the unsaturated dicarboxylic acid-based monomer (b-2) include maleic acid, maleic anhydride, fumaric acid, itaconic acid, citraconic acid, and a monovalent metal salt, a divalent metal salt, an ammonium salt, and an organic amine salt thereof. Preferred examples of the unsaturated dicarboxylic acid-based monomer (b-2) include maleic acid, maleic anhydride, fumaric acid, itaconic acid, citraconic acid, and a salt (e.g., a monovalent metal salt, a divalent metal salt, an ammonium salt, or an organic amine salt) thereof. More preferred examples thereof include α,β-unsaturated dicarboxylic acid-based monomers such as maleic acid, maleic anhydride, fumaric acid, citraconic acid, and a salt (e.g., a monovalent metal salt, a divalent metal salt, an ammonium salt, or an organic amine salt) thereof.

In the production of the polycarboxylic acid-based copolymer in the present invention, monomer components used for polymerization may include, in addition to the unsaturated polyalkylene glycol ether-based monomer (a) and the unsaturated carboxylic acid-based monomer (b), any other appropriate monomer (c) capable of being copolymerized with the monomer (a) and the monomer (b). The other monomers (c) may be used alone or in combination.

Specific examples of the other monomers (c) include half esters and diesters derived from the above-mentioned unsaturated dicarboxylic acid-based monomer (b-2) and an alcohol having 1 to 30 carbon atoms; half amides and diamides derived from the above-mentioned unsaturated dicarboxylic acid-based monomer (b-2) and an amine having 1 to 30 carbon atoms; half esters and diesters derived from an alkyl (poly) alkylene glycol and the above-mentioned unsaturated dicarboxylic acid-based monomer (b-2); half esters and diesters derived from the above-mentioned unsaturated dicarboxylic acid-based monomer (b-2) and a glycol having 2 to 18 carbon atoms or a polyalkylene glycol obtained by adding 2 to 500 mol of an alkylene oxide to the glycol; esters derived from the unsaturated monocarboxylic acid-based monomer (b-1) such as methyl (meth) acrylate, ethyl (meth) acrylate, propyl (meth) acrylate, glycidyl (meth) acrylate, methyl crotonate, ethyl crotonate, or propyl crotonate and an alcohol having 1 to 30 carbon atoms; esters derived from an alkoxy (poly) alkylene glycol obtained by adding 1 to 500 mol of an alkylene oxide having 2 to 18 carbon atoms to an alcohol having 1 to 30 carbon atoms and the unsaturated monocarboxylic acid-based monomer (b-1) such as (meth) acrylic acid; adducts of 1 to 500 mol of an alkylene oxide having 2 to 18 carbon atoms with the unsaturated monocarboxylic acid-based monomer (b-1) such as (meth) acrylic acid, such as (poly) ethylene glycol monomethacrylate, (poly) propylene glycol monomethacrylate, and (poly) butylene glycol monomethacrylate; half amides derived from maleamic acid and a glycol having 2 to 18 carbon atoms or a polyalkylene glycol obtained by adding to 2 to 500 mol of an alkylene oxide to the glycol; (poly) alkylene glycol di (meth)acrylates such as triethylene glycol di(meth)acrylate, (poly)ethylene glycol di(meth)acrylate, polypropylene glycol di(meth)acrylate, and (poly)ethylene glycol (poly) propylene glycol di(meth) acrylate; bifunctional (meth)acrylates such as hexanediol di(meth)acrylate, trimethylolpropane tri(meth)acrylate, and trimethylolpropane di(meth)acrylate; (poly)alkylene glycol dimalates such as triethylene glycol dimalate and polyethylene glycol dimalate; unsaturated sulfonic acids such as vinyl sulfonate, (meth) allyl sulfonate, 2-(meth)acryloxyethyl sulfonate, 3-(meth)acryloxypropyl sulfonate, 3-(meth)acryloxy-2-hydroxypropyl sulfonate, 3-(meth)acryloxy-2-hydroxypropyl sulfophenyl ether, 3-(meth)acryloxy-2-hydroxypropyloxysulfobenzoate, 4-(meth)acryloxybutyl sulfonate, (meth)acrylamidomethylsulfonic acid, (meth) acrylamidoethylsulfonic acid, 2-methylpropanesulfonic acid (meth)acrylamide, and styrenesulfonic acid, and a monovalent metal salt, a divalent metal salt, an ammonium salt, and an organic amine salt thereof; amides derived from the unsaturated monocarboxylic acid-based monomer (b-1) and an amine having 1 to 30 carbon atoms, such as methyl(meth) acrylamide; vinyl aromatic compounds such as styrene, α-methylstyrene, vinyltoluene, and p-methylstyrene; alkanediol mono(meth)acrylates such as 1,4-butanediol mono(meth)acrylate, 1,5-pentanediol mono (meth)acrylate, and 1,6-hexanediol mono (meth)acrylate; dienes such as butadiene, isoprene, 2-methyl-1,3-butadiene, and 2-chloro-1, 3-butadiene; unsaturated amides such as (meth) acrylamide, (meth) acrylalkylamide, N-methylol (meth)acrylamide, and N,N-dimethyl(meth)acrylamide; unsaturated cyano compounds such as (meth)acrylonitrile and α-chloroacrylonitrile; unsaturated esters such as vinyl acetate and vinyl propionate; unsaturated amines such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate, and vinylpyridine; divinyl aromatic compounds such as divinylbenzene; cyanurates such as triallyl cyanurate; allyl compounds such as (meth) allyl alcohol and glycidyl (meth) allyl ether; unsaturated amino compounds such as dimethylaminoethyl (meth)acrylate; vinyl ethers or allyl ethers such as methoxypolyethylene glycol monovinyl ether, polyethylene glycol monovinyl ether, methoxypolyethylene glycol mono(meth) allyl ether, and polyethylene glycol mono(meth) allyl ether; and siloxane derivatives such as polydimethylsiloxanepropylaminomaleamic acid, polydimethylsiloxaneaminopropyleneaminomaleamic acid, polydimethylsiloxane-bis-(propylaminomaleamic acid), polydimethylsiloxane-bis-(dipropyleneaminomaleamic acid), polydimethylsiloxane-(1-propyl-3-acrylate), polydimethylsiloxane-(1-propyl-3-methacrylate), polydimethylsiloxane-bis-(1-propyl-3-acrylate), and polydimethylsiloxane-bis-(1-propyl-3-methacrylate).

In the production method for a polycarboxylic acid-based copolymer of the present invention, monomer components including the above-mentioned monomer (a) and the above-mentioned monomer (b) are polymerized using a peroxide and a reductant as polymerization initiators in combination while the pH during polymerization is controlled to 3 or less in the presence of a pH adjustor.

The above-mentioned monomer components are polymerized by any appropriate method. Examples of the method include solution polymerization and bulk polymerization. There are exemplified, as types of the solution polymerization, a batch type and a continuous type. For solvents which may used in the solution polymerization, there are given: water; alcohols such as methyl alcohol, ethyl alcohol, and isopropyl alcohol; aromatic or aliphatic hydrocarbons such as benzene, toluene, xylene, cyclohexane, and n-hexane; ester compounds such as ethyl acetate; ketone compounds such as acetone and methyl ethyl ketone; cyclic ether compounds such as tetrahydrofuran and dioxane; and the like.

A chain transfer agent may be used in the polymerization of the above-mentioned monomer components. The use of the chain transfer agent facilitates the adjustment of the molecular weight of the resultant copolymer.

Any appropriate chain transfer agent may be employed as the above-mentioned chain transfer agent. Specific examples of the chain transfer agent include: thiol-based chain transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mercaptoethanesulfonic acid, n-dodecylmercaptan, octylmercaptan, and butyl thioglycolate; halogenated compounds such as carbon tetrachloride, methylene chloride, bromoform, and bromotrichloroethane; secondary alcohols such as isopropanol; and lower oxides and salts thereof such as phosphorous acid, hypophosphorous acid, and a salt thereof (e.g., sodium hypophosphite or potassium hypophosphite) and sulfurous acid, hydrogen sulfite, dithionous acid, metabisulfurous acid, and a salt thereof (e.g., sodium sulfite, potassium sulfite, sodium hydrogen sulfite, potassium hydrogen sulfite, sodium dithionite, potassium dithionite, sodium metabisulfite, or potassium metabisulfite).

In the production method of the present invention, the peroxide and the reductant are used as polymerization initiators in combination.

Any appropriate peroxide may be employed as the above-mentioned peroxide. Examples of the peroxide include: persulfuric acid salts such as ammonium persulfate, sodium persulfate, and potassium persulfate; hydrogen peroxide; and peroxides such as benzoyl peroxide, lauroyl peroxide, sodium peroxide, t-butylhydroperoxide, and cumene hydroperoxide.

Any appropriate reductant may be employed as the above-mentioned reductant. Examples of the reductant include: salts of low valent metals typified by Mohr's salt, such as iron (II), tin (II), titanium (III), chromium (II), V (II), and Cu (II); amine compounds and salts thereof such as monoethanolamine, diethanolamine, triethanolamine, hydroxylamine, hydroxylamine hydrochloride, and hydrazine; sodium dithionite, formaldehyde sodium sulfoxylate, and sodium hydroxymethanesulfinate dihydrate; organic compounds including an —SH group, an —SO$_2$H group, an —NHNH$_2$ group, and a —COCH(OH)— group and salts thereof; alkali metal sulfurous acid salts such as sodium sulfite, sodium hydrogen sulfite, and metabisulfites; lower oxides and salts thereof such as hypophosphorous acid, sodium hypophosphite, sodium hydrosulfite, and sodium hyponitrite; invert sugars such as D-fructose and D-glucose; thiourea compounds such as thiourea and thiourea dioxide; and (an) L-ascorbic acid (salt), an L-ascorbic acid ester, (an) erythorbic acid (salt), and an erythorbic acid ester.

The combination of the above-mentioned peroxide and the above-mentioned reductant is preferably a combination of a water-soluble peroxide and a water-soluble reductant. Examples of the combination include a combination of hydrogen peroxide and L-ascorbic acid, a combination of hydrogen peroxide and erythorbic acid, a combination of hydrogen peroxide and Mohr's salt, and a combination of sodium persulfate and sodium bisulfite. The combination is particularly preferably a combination of hydrogen peroxide and L-ascorbic acid from the viewpoint of additionally effective expression of the effect the present invention.

The use amount of the above-mentioned peroxide is preferably 0.01 to 30 mol %, more preferably 0.1 to 20 mol %, or even more preferably 0.5 to 10 mol % with respect to the total amount of the monomer components. When the use amount of the above-mentioned peroxide is less than 0.01 mol % with respect to the total amount of the monomer components, unreacted monomers may increase. When the use amount of the above-mentioned peroxide is more than 30 mol % with respect to the total amount of the monomer components, a polycarboxylic acid including an oligomer moiety in a large amount may be obtained.

The use amount of the above-mentioned reductant is preferably 0.1 to 500 mol %, more preferably 1 to 200 mol %, or even more preferably 10 to 100 mol % with respect to the above-mentioned peroxide. When the use amount of the above-mentioned reductant is less than 0.1 mol % with respect to the above-mentioned peroxide, active radicals are not sufficiently generated, with the result that unreacted monomers may increase. When the use amount of the above-mentioned reductant is more than 500 mol % with respect to the above-mentioned peroxide, the reductant remaining without reacting with hydrogen peroxide may increase.

In the polymerization of the above-mentioned monomer components, it is preferred that at least one of the above-mentioned peroxide and the above-mentioned reductant be constantly present in a reaction system. To be specific, it is preferred that the peroxide and the reductant be not simultaneously loaded in one batch. When the peroxide and the reductant are simultaneously loaded in one batch, the peroxide and the reductant react with each other drastically, and hence, a large amount of heat of reaction is generated immediately after the loading, which makes reaction control difficult. Besides, a radical concentration decreases drastically thereafter, and hence, unreacted monomer components may remain in a large amount. In addition, radical concentrations for monomer components at the initial stage and the latter half of the reaction extremely differs from each other, and hence, the molecular weight distribution becomes extremely large, with the result that the performance in the case where the resultant copolymer is used for a cement admixture may deteriorate. Accordingly, it is preferred to employ a method of adding both the peroxide and the reductant over a long period of time, such as a continuously loading method through dropping or the like or a separately loading method. It should be noted that the time from the loading of one of the above-mentioned peroxide and the above-mentioned reductant to the start of the loading of the other is preferably within 5 hours or more preferably within 3 hours.

The polymerization reaction temperature is preferably 30 to 90° C., more preferably 35 to 85° C., or even more preferably 40 to 80° C. When the polymerization reaction temperature does not fall within the above-mentioned range, a reduction in polymerization degree and a reduction in productivity may occur.

The polymerization time is preferably 0.5 to 10 hours, more preferably 0.5 to 8 hours, or even more preferably 1 to 6 hours. When the polymerization time does not fall within the above-mentioned range, a reduction in polymerization degree and a reduction in productivity may occur.

Any appropriate method may be employed as a method of loading monomer components into a reaction vessel. Examples of the method include a method of loading the whole amount into a reaction vessel in one batch at the initial stage, a method of separately or continuously loading the whole amount into a reaction vessel, and a method of loading a part into a reaction vessel at the initial stage and separately or continuously loading the rest into the reaction vessel. Specific examples of the method include a method of continuously loading the whole amount of the monomer (a) and the whole amount of the monomer (b) into a reaction vessel, and a method of loading a part of the monomer (a) into a reaction vessel at the initial stage and continuously loading the rest of the monomer (a) and the whole amount of the monomer (b) into the reaction vessel, a method of loading a part of the monomer (a) and a part of the monomer (b) into a reaction vessel at the initial stage and separately loading the rest of the monomer (a) and the rest of the monomer (b) alternately into the reaction vessel in several portions. In addition, two or more kinds of copolymers having different ratios of the structural unit (I) to the structural unit (II) may be simultaneously synthesized during a polymerization reaction by changing a speed at which each monomer is loaded into a reaction vessel in a continuous or stepwise fashion in the middle of the reaction to change the loading mass ratio per unit time of each monomer in a continuous or stepwise fashion.

In the production method of the present invention, the above-mentioned monomer components are polymerized while the pH during polymerization is controlled to 3 or less or preferably while the pH during polymerization is controlled to 2 to 3 in the presence of a pH adjustor. When the above-mentioned monomer components are polymerized while the pH during polymerization is controlled to 3 or less in the presence of a pH adjustor, sufficient copolymerization property can be easily expressed for the unsaturated polyalkylene glycol ether-based monomer. As a result, the production cost of a produced polycarboxylic acid-based copolymer can be reduced, and there can produced a polycarboxylic acid-based copolymer with which an unprecedentedly high-performance cement admixture can be provided.

Examples of the above-mentioned pH adjustor include phosphoric acid and/or a salt thereof, an organic sulfonic acid and/or a salt thereof, hydrochloric acid and/or a salt thereof, nitric acid and/or a salt thereof, and sulfuric acid and/or a salt thereof. Of those, at least one kind selected from phosphoric acid and/or a salt thereof and an organic sulfonic acid and/or a salt thereof is preferred, and an organic sulfonic acid and/or a salt thereof are/is more preferred because the addition amount can be reduced.

Any appropriate salt may be employed as the salt. Examples of the salt include an alkali metal salt, an alkaline earth metal salt, an ammonium salt, and an organic ammonium salt. The pH adjustors may be used alone or in combination.

Specific examples of the organic sulfonic acid and/or the salt thereof include p-toluenesulfonic acid and/or a hydrate thereof and methanesulfonic acid and/or a salt thereof.

The use amount of the above-mentioned pH adjustor is preferably 0.01 to 5 mass %, more preferably 0.05 to 4 mass %, or even more preferably 0.05 to 2.5 mass % with respect to the total amount of the monomer components. When the use amount of the pH adjustor is too large, the pH during polymerization decreases excessively, and thus, a polymerization condition may become inappropriate. Further, the ratio of the use amount of the pH adjustor with respect to the total amount of the above-mentioned monomer components is substantially the same as the ratio of the mass of the pH adjustor with respect to the mass of the copolymer in the resultant composition. Therefore, the ratio of the mass of the pH adjustor with respect to the mass of the copolymer in the resultant composition is preferably 0.01 to 5 mass %, more preferably 0.05 to 4 mass %, or even more preferably 0.05 to 2.5 mass %.

In the production method of the present invention, the above-mentioned monomer components are polymerized while the pH during polymerization is controlled to 3 or less in the presence of the pH adjustor. Meanwhile, the pH may be adjusted to any appropriate value after polymerization. In order to provide a high-performance cement admixture, the pH is preferably adjusted to 4 to 7 after polymerization.

The polycarboxylic acid-based copolymer obtained by the production method of the present invention has a mass average molecular weight (Mw) of preferably 10,000 to 300,000, more preferably 10,000 to 100,000, or even more preferably 10,000 to 80,000. When the mass average molecular weight (Mw) falls within the above-mentioned range, a high-performance cement admixture can be provided.

The polycarboxylic acid-based copolymer obtained by the production method of the present invention can be suitably used for a copolymer for a cement admixture.

When the polycarboxylic acid-based copolymer obtained by the production method of the present invention is used for a copolymer for a cement admixture, the content of the polycarboxylic acid-based copolymer in the resultant cement admixture is preferably 5 to 100 mass %, more preferably 10 to 100 mass %, or even more preferably 15 to 100 mass %. This is because the effect of the present invention can be exhibited sufficiently.

The above-mentioned cement admixture may contain any other appropriate component in addition to the polycarboxylic acid-based copolymer obtained by the production method of the present invention.

The above-mentioned cement admixture may contain one kind or two or more kinds of any appropriate cement dispersing agent. When the above-mentioned cement dispersing agent is used, the blending mass ratio of the polycarboxylic acid-based copolymer obtained by the production method of the present invention to the above-mentioned cement dispersing agent (the cement admixture of the present invention/the above-mentioned cement dispersing agent) varies depending on the kind of the above-mentioned cement dispersing agent to be used, the blending condition, the test condition, and the like, and hence cannot be unambiguously determined. However, the blending mass ratio is preferably 1 to 99/99 to 1, more preferably 5 to 95/95 to 5, or even more preferably 10 to 90/90 to 10 at a mass ratio (mass %) in terms of solids content.

Examples of the above-mentioned cement dispersing agent which may be used in combination with the polycarboxylic acid-based copolymer obtained by the production method of the present invention include the following cement dispersing agents.

There are given: a variety of sulfonic acid-based dispersing agents each having a sulfonic acid group in the molecule, for example, polyalkylarylsulfonic acid salt-based dispersing agents such as a naphthalenesulfonic acid formaldehyde condensate, a methyl naphthalenesulfonic acid formaldehyde condensate, and an anthracenesulfonic acid formaldehyde condensate; melamine formalin resin sulfonic acid salt-based dispersing agents such as a melamine sulfonic acid formaldehyde condensate; aromatic aminosulfonic acid salt-based dispersing agents such as an aminoarylsulfonic acid-phenol-formaldehyde condensate; ligninsulfonic acid salt-based dispersing agents such as a ligninsulfonic acid salt and a modified ligninsulfonic acid salt; and polystyrene sulfonic acid salt-based dispersing agents.

There are also given: a copolymer obtained by polymerization of a polyalkylene glycol mono (meth) acrylic acid ester-based monomer, a (meth) acrylic acid-based monomer, and a monomer capable of being copolymerized with those monomers, as described in each of JP 59-18338 B and JP 07-223852 A; and various polycarboxylic acid-based dispersing agents each having a (poly)oxyalkylene group and a carboxyl group in the molecule such as a hydrophilic graft polymer obtained by graft polymerization of a polyether compound with an unsaturated carboxylic acid-based monomer, as described in JP 07-53645 A, JP 08-208769 A, and JP 08-208770 A.

The above-mentioned cement admixture may contain any appropriate cement additive (cement addition material). Examples of the cement additive (cement addition material) include a water-soluble polymer substance, a polymer emulsion, a hardening retarder, a high-early-strength agent/promoter, an antifoaming agent, an AE agent, a water-proofing agent, a rust preventive, a crack-reducing agent, an expanding agent, a cement-wetting agent, a thickener, a separation-reducing agent, a flocculant, a drying shrinkage-reducing agent, a strength enhancer, a self-leveling agent, a colorant, and a mildewcide.

The above-mentioned cement additives (cement addition materials) may be used alone or in combination.

The following items (1) to (7) are exemplified as particularly suitable embodiments of the above-mentioned cement admixture.

(1) A combination including the above-mentioned cement admixture <1> and an oxyalkylene-based antifoaming agent <2> as two essential components. Examples of the oxyalkylene-based antifoaming agent include polyoxyalkylenes, polyoxyalkylene alkyl ethers, polyoxyalkylene acetylene ethers, and polyoxyalkylene alkyl amines. Of those, polyoxyalkylene alkyl amines are preferred. It should be noted that the blending mass ratio of the oxyalkylene-based antifoaming agent <2> is preferably in the range of 0.01 to 20 mass % with respect to the above-mentioned cement admixture <1>.

(2) A combination including the above-mentioned cement admixture <1>, an oxyalkylene-based antifoaming agent <2>, and an AE agent <3> as three essential components. Examples of the oxyalkylene-based antifoaming agent include polyoxyalkylenes, polyoxyalkylene alkyl ethers, polyoxyalkylene acetylene ethers, and polyoxyalkylene alkyl amines. Of those, polyoxyalkylene alkyl amines are preferred. It should be noted that the blending mass ratio of the oxyalkylene-based antifoaming agent <2> is preferably in the range of 0.01 to 20 mass % with respect to the above-mentioned cement admixture <1>. Further, the blending mass ratio of the AE agent <3> is preferably in the range of 0.001 to 2 mass % with respect to the above-mentioned cement admixture <1>.

(3) A combination including the above-mentioned cement admixture <1>, a copolymer <2> obtained by polymerization of a polyalkylene glycol mono(meth)acrylic acid ester-based monomer having a polyoxyalkylene chain to which an alkylene oxide having 2 to 18 carbon atoms has been added with an average addition mole number of 2 to 300, a (meth) acrylic acid-based monomer, and a monomer capable of being copolymerized with those monomers (for example, described in JP 59-18338 B and JP 07-223852 A), and an oxyalkylene-based antifoaming agent <3> as three essential components. Examples of the oxyalkylene-based antifoaming agent include polyoxyalkylenes, polyoxyalkylene alkyl ethers, polyoxyalkylene acetylene ethers, and polyoxyalkylene alkyl amines. Of those, polyoxyalkylene alkyl amines are preferred. It should be noted that the blending ratio of the above-mentioned cement admixture <1> to the copolymer <2> is preferably 5/95 to 95/5 or more preferably 10/90 to 90/10 at amass ratio of the above-mentioned cement admixture <1>/the copolymer <2>. Further, the blending mass ratio of the oxyalkylene-based antifoaming agent <3> is preferably in the range of 0.01 to 20 mass % with respect to the total amount of the above-mentioned cement admixture <1> and the copolymer <2>.

(4) A combination including the above-mentioned cement admixture <1> and a sulfonic acid-based dispersing agent <2> having a sulfonic acid group in the molecule as two essential components. Examples of the sulfonic acid-based dispersing agent include a ligninsulfonic acid salt, a naphthalenesulfonic acid formalin condensate, a melaminesulfonic acid formalin condensate, a polystyrenesulfonic acid salt, and aminosulfonic acid-based dispersing agents such as an aminoarylsulfonic acid-phenol-formaldehyde condensate. It should be noted that the blending ratio of the above-mentioned cement admixture <1> to the sulfonic acid-based dispersing agent <2> is preferably 5/95 to 95/5 or more preferably 10/90 to 90/10 at a mass ratio of the above-mentioned cement admixture <1>/the sulfonic acid-based dispersing agent <2>.

(5) A combination including the above-mentioned cement admixture <1> and a material separation-reducing agent <2> as two essential components. Examples of the material separation-reducing agent include a variety of thickeners such as a nonionic cellulose ethers, and compounds having, as partial structures, a hydrophobic substituent formed of a hydrocarbon chain having 4 to 30 carbon atoms, and a polyoxyalkylene chain to which an alkylene oxide having 2 to 18 carbon atoms has been added with an average addition mole number of 2 to 300. It should be noted that the blending ratio of the above-mentioned cement admixture <1> to the material separation-reducing agent <2> is preferably 10/90 to 99.99/0.01 or more preferably 50/50 to 99.9/0.1 at a mass ratio of the above-mentioned cement admixture <1>/the material separation-reducing agent <2>. This combination of cement admixture is suitable for high-fluidity concrete, self-compacting concrete, and a self-leveling agent.

(6) A combination including the above-mentioned cement admixture <1> and a retarder <2> as two essential components. Examples of the retarder include oxycarboxylic acids such as gluconic acid (salt) and citric acid (salt), sugars such as glucose, sugar alcohols such as sorbitol, and phosphonic acids such as aminotri (methylenephosphonic acid). Of those, oxycarboxylic acids are preferred. It should be noted that the blending ratio of the above-mentioned cement admixture <1> to the retarder <2> is preferably 50/50 to 99.9/0.1 or more preferably 70/30 to 99/1 at amass ratio of the above-mentioned cement admixture <1>/the retarder <2>.

(7) A combination including the above-mentioned cement admixture <1> and a promoter <2> as two essential components. Examples of the promoter include soluble calcium salts such as calcium chloride, calcium nitrite, and calcium nitrate, chlorides such as iron chloride and magnesium chloride, thiosulfuric acid salts, formic acid, and formic acid salts such as calcium formate. It should be noted that the blending ratio of the above-mentioned cement admixture <1> to the promoter <2> is preferably 10/90 to 99.9/0.1 or more preferably 20/80 to 99/1 at a mass ratio of the above-mentioned cement admixture <1>/the promoter <2>.

The cement admixture using the polycarboxylic acid-based copolymer obtained by the production method of the present invention may be added to a cement composition such as cement paste, mortar, or concrete before use.

Any appropriate cement composition may be employed as the above-mentioned cement composition. Examples of the cement composition include cement compositions including cement, water, an aggregate, and an antifoaming agent.

Any appropriate cement may be employed as the above-mentioned cement. Examples of the cement include portland cement (ordinary portland cement, high-early-strength portland cement, ultra high-early-strength portland cement, moderate-heat portland cement, sulfate-resistant portland cement, and a low alkali type thereof), a variety of mixed cement (blast-furnace slag cement, silica cement, and fly ash cement), white portland cement, alumina cement, ultra rapid hardening cement (one-clinker ultra rapid hardening cement, two-clinker ultra rapid hardening cement, and magnesium phosphate cement), grouting cement, oil well cement, low-heat cement (low-heat blast-furnace slag cement, fly ash-mixed low-heat blast-furnace slag cement, and belite-rich cement), ultra high-strength cement, a cement-based solidification material, and eco-cement (cement produced using one or more kinds of municipal waste incineration ash and sewage sludge incineration ash as a raw material). In addition, fine powder such as blast furnace slag, fly ash, cinder ash, clinker ash, husk ash, silica powder, or limestone powder, or gypsum may be added.

Any appropriate aggregate may be employed as the above-mentioned aggregate. Examples of the aggregate include ballast, crushed stone, water-granulated slag, and a recycled aggregate. Further, refractory aggregates such as quartzite aggregate, fireclay aggregate, zircon aggregate, high alumina aggregate, silicon carbide aggregate, graphite aggregate, chromium aggregate, chrome-magnesite aggregate, and magnesite aggregate may also be used, for example.

Any appropriate antifoaming agent may be employed as the above-mentioned antifoaming agent. Examples of the antifoaming agent include the antifoaming agents described in the paragraphs [0041] and [0042] in JP 3683176 B.

As for the blending amount and unit water content per m³ of concrete in the above-mentioned cement composition, in order, for example, to produce high-durability and high strength-concrete, it is preferred that the unit water content be 100 to 185 kg/m³ and the water/cement ratio be 10 to 70 mass %, and it is more preferred that the unit water content be 120 to 175 kg/m³ and the water/cement ratio be 20 to 65 mass %.

The addition amount in the case of adding the above-mentioned cement admixture to the cement composition is preferably 0.01 to 10 mass %, more preferably 0.05 to 8 mass %, or even more preferably 0.1 to 5 mass % with respect to 100 mass % of the total amount of the cement. When the above-mentioned addition amount is less than 0.01 mass %, the performance of the cement composition may be poor. When the above-mentioned addition amount is more than 10 mass %, the economic efficiency may be poor.

The above-mentioned cement composition may be prepared by blending the above-mentioned respective components by any appropriate method. For example, there is given a method involving kneading in a mixer.

<<2. Copolymer Composition for Cement Admixture>>

The copolymer composition for a cement admixture of the present invention includes a polycarboxylic acid-based copolymer including the structural unit (I) derived from the unsaturated polyalkylene glycol ether-based monomer (a) represented by the above-mentioned general formula (1) and the structural unit (II) derived from the unsaturated carboxylic acid-based monomer (b) represented by the above-mentioned general formula (2), and a nonpolymerizable organic sulfonic acid having a molecular weight of 300 or less and/or a salt thereof.

The polycarboxylic acid-based copolymer included in the copolymer composition for a cement admixture of the present invention may include only one kind of structural unit (I) derived from the unsaturated polyalkylene glycol ether-based monomer (a) represented by the above-mentioned general formula (1), or may include two or more kinds thereof. The polycarboxylic acid-based copolymer in the present invention may include only one kind of structural unit (II) derived from the unsaturated carboxylic acid-based monomer (b) represented by the above-mentioned general formula (2), or may include two or more kinds thereof.

The structural unit (I) derived from the unsaturated polyalkylene glycol ether-based monomer (a) represented by the above-mentioned general formula (1) in the polycarboxylic acid-based copolymer included in the copolymer composition for a cement admixture of the present invention is specifically a structural unit in which a polymerizable unsaturated double bond possessed by Y in the above-mentioned general formula (1) has been cleaved through polymerization into a single bond. For example, when Y is represented by P=Q-, the structural unit (I) derived from the unsaturated polyalkylene glycol ether-based monomer (a) represented by the above-mentioned general formula (1) is represented by the general formula (1).

The structural unit (II) derived from the unsaturated carboxylic acid-based monomer (b) represented by the above-mentioned general formula (2) in the polycarboxylic acid-based copolymer included in the copolymer composition for a cement admixture of the present invention is specifically represented by the general formula (II):

(in the general formula (II): $R^3$, $R^4$, and $R^5$ are identical to or different from each other and each represent a hydrogen atom, a methyl group, or a —COOM group; M represents a hydrogen atom, a monovalent metal atom, a divalent metal atom, an ammonium group, or an organic amine group).

The total content of the above-mentioned structural unit (I) and the above-mentioned structural unit (II) in the polycarboxylic acid-based copolymer included in the copolymer composition for a cement admixture of the present invention is preferably 10 to 100 mass %, more preferably 20 to 100 mass %, or even more preferably 30 to 100 mass %. When the total content of the above-mentioned structural unit (I) and the above-mentioned structural unit (II) in the polycarboxylic acid-based copolymer in the present invention falls within the above-mentioned range, it is possible to provide a polycarboxylic acid-based copolymer with which a high performance cement admixture can be provided.

The content of the above-mentioned structural unit (I) in the polycarboxylic acid-based copolymer included in the copolymer composition for a cement admixture of the present invention is preferably 10 to 99 mass %, more preferably 20 to 99 mass %, or even more preferably 30 to 99 mass %. When the content of the above-mentioned structural unit (I) in the polycarboxylic acid-based copolymer in the present invention falls within the above-mentioned range, it is possible to provide a polycarboxylic acid-based copolymer with which a high performance cement admixture can be provided.

The content of the above-mentioned structural unit (II) in the polycarboxylic acid-based copolymer included in the copolymer composition for a cement admixture of the present invention is preferably 1 to 90 mass %, more preferably 1 to 80 mass %, or even more preferably 1 to 70 mass %. When the content of the above-mentioned structural unit (II) in the polycarboxylic acid-based copolymer in the present invention falls within the above-mentioned range, it is possible to provide a polycarboxylic acid-based copolymer with which a high performance cement admixture can be provided.

Y, T, m, $R^1O$, n, and $R^2$ in the general formula (1) are as described in the above section <<1. Production method for polycarboxylic acid-based copolymer>>.

$R^3$, $R^4$, and $R^5$ in the general formula (2) are as described in the above section <<1. Production method for polycarboxylic acid-based copolymer>>.

The unsaturated polyalkylene glycol ether-based monomer (a) is as described in the above section <<1. Production method for polycarboxylic acid-based copolymer>>.

The unsaturated carboxylic acid-based monomer (b) is as described in the above section <<1. Production method for polycarboxylic acid-based copolymer>>.

In the production of the copolymer composition for a cement admixture of the present invention, monomer components used for polymerization may contain, in addition to an unsaturated polyalkylene glycol ether-based monomer (a) and an unsaturated carboxylic acid-based monomer (b), any other appropriate monomer (c) capable of being copolymerized with the monomer (a) and the monomer (b). The other monomers (c) may be used alone or in combination.

The other monomers (c) are as described in the above section <<1. Production method for polycarboxylic acid-based copolymer>>.

The polycarboxylic acid-based copolymer included in the copolymer composition for a cement admixture of the present invention has a mass average molecular weight (Mw) of preferably 10,000 to 300,000, more preferably 10,000 to 100,000, or even more preferably 10,000 to 80,000. When the mass average molecular weight (Mw) falls within the above-mentioned range, a copolymer composition for a high-performance cement admixture can be provided.

The copolymer composition for a cement admixture of the present invention contains a nonpolymerizable organic sulfonic acid having a molecular weight of 300 or less and/or a salt thereof. Any appropriate nonpolymerizable organic sulfonic acid having a molecular weight of 300 or less and/or any appropriate salt thereof may be employed as the nonpolymerizable organic sulfonic acid having a molecular weight of 300 or less and/or the salt thereof. Any appropriate salt may be employed as the salt. Examples of the salt include an alkali metal salt, an alkaline earth metal salt, an ammonium salt, and an organic ammonium salt. The nonpolymerizable organic sulfonic acids each having a molecular weight of 300 or less and/or the salts thereof may be used alone or in combination.

The above-mentioned organic sulfonic acid is preferably a compound represented by the general formula (3):

$$R_6-(Ph)_p-SO_3H \quad (3)$$

(in the general formula (3): $R^6$ represents a hydrogen atom or an alkyl group having 1 to 6 carbon atoms; and Ph represents a phenylene group; and p represents 0 or 1).

In order to additionally express the effect of the present invention, the compound represented by the above-mentioned general formula (3) is preferably a low molecular weight compound having a molecular weight of 250 or less or more preferably a low molecular weight compound having a molecular weight of 200 or less.

In order to additionally express the effect of the present invention, $R^6$ in the above-mentioned general formula (3) preferably represents an alkyl group having 1 or 2 carbon atoms. Specific examples of the alkyl group include a methyl group and an ethyl group.

In order to additionally express the effects of the present invention, Y in the above-mentioned general formula (1) represents an alkenyl group having 4 or 5 carbon atoms.

Specific examples of the nonpolymerizable organic sulfonic acid having a molecular weight of 300 or less and/or the salt thereof include p-toluenesulfonic acid and/or a hydrate thereof and methanesulfonic acid and/or a salt thereof.

The content of the nonpolymerizable organic sulfonic acid having a molecular weight of 300 or less and/or the salt thereof in the copolymer composition for a cement admixture of the present invention is preferably 0.01 to 5 mass %, more preferably 0.05 to 4 mass %, or even more preferably 0.05 to 2.5 mass % with respect to the polycarboxylic acid-based copolymer included in the copolymer composition for a cement admixture of the present invention. When the content of the nonpolymerizable organic sulfonic acid having a molecular weight of 300 or less and/or the salt thereof in the copolymer composition for a cement admixture of the present invention falls within the above-mentioned range, it is possible to provide a copolymer composition for a cement admixture with which an unprecedentedly high-performance cement admixture can be provided.

The copolymer composition for a cement admixture of the present invention may be produced by any appropriate method. Monomer components including the above-mentioned monomer (a) and the above-mentioned monomer (b) are preferably polymerized using a peroxide and a reductant as polymerization initiators in combination while the pH during polymerization is controlled to 3 or less in the presence of a pH adjustor including a nonpolymerizable organic sulfonic acid having a molecular weight of 300 or less and/or a salt thereof as an essential component.

The above-mentioned monomer components may be polymerized by any appropriate method. Examples of the method include the methods described in the above section <<1. Production method for polycarboxylic acid-based copolymer>>.

In the polymerization of the above-mentioned monomer components, a chain transfer agent may be used. The use of the chain transfer agent facilitates the adjustment of the molecular weight of the resultant copolymer.

Any appropriate chain transfer agent may be employed as the above-mentioned chain transfer agent. Specific examples of the chain transfer agent include the chain transfer agents described in the above section <<1. Production method for polycarboxylic acid-based copolymer>>.

In the production of the copolymer composition for a cement admixture of the present invention, it is preferred to use a peroxide and a reductant as polymerization initiators in combination.

Any appropriate peroxide may be employed as the above-mentioned peroxide. Examples of the peroxide include the peroxides described in the above section <<1. Production method for polycarboxylic acid-based copolymer>>.

Any appropriate reductant may be employed as the above-mentioned reductant. Examples of the reductant includes the reductants described in the above section <<1. Production method for polycarboxylic acid-based copolymer>>.

The combination of the above-mentioned peroxide and the above-mentioned reductant is as described in the above section <<1. Production method for polycarboxylic acid-based copolymer>>.

The use amount of the above-mentioned peroxide is as described in the above section <<1. Production method for polycarboxylic acid-based copolymer>>.

The use amount of the above-mentioned reductant is as described in the above section <<1. Production method for polycarboxylic acid-based copolymer>>.

In the polymerization of the above-mentioned monomer components, similarly to the description in the above section <<1. Production method for polycarboxylic acid-based copolymer>>, it is preferred that at least one of the above-mentioned peroxide and the above-mentioned reductant be constantly present in a reaction system.

The polymerization reaction temperature is as described in the above section <<1. Production method for polycarboxylic acid-based copolymer>>.

The polymerization time is as described in the above section <<1. Production method for polycarboxylic acid-based copolymer>>.

Any appropriate method may be employed as a method of loading monomer components into a reaction vessel. Examples of the method include the methods described in the above section <<1. Production method for polycarboxylic acid-based copolymer>>.

In the production of the copolymer composition for a cement admixture of the present invention, the above-mentioned monomer components are polymerized preferably while the pH during polymerization is controlled to 3 or less or more preferably while the pH during polymerization is controlled to 2 to 3 in the presence of the pH adjustor including a nonpolymerizable organic sulfonic acid having a molecular weight of 300 or less and/or a salt thereof as an essential component. When the above-mentioned monomer components are polymerized while the pH during polymerization is controlled to 3 or less in the presence of the pH adjustor, sufficient copolymerization property can be easily expressed for the unsaturated polyalkylene glycol ether-based monomer. As a result, the production cost of a produced polycarboxylic acid-based copolymer can be reduced, and there can be produced a copolymer composition for a cement admixture with which an unprecedentedly high-performance cement admixture can be provided.

Any appropriate pH adjustor may be employed as the above-mentioned pH adjustor as long as the pH adjustor contains a nonpolymerizable organic sulfonic acid having a molecular weight of 300 or less and/or a salt thereof as an essential component. Examples of the nonpolymerizable organic sulfonic acid having a molecular weight of 300 or less and/or the salt thereof include the above-mentioned compounds. Examples of the pH adjustor excluding the nonpolymerizable organic sulfonic acid having a molecular weight of 300 or less and/or the salt thereof include phosphoric acid and/or a salt thereof, hydrochloric acid and/or a salt thereof, nitric acid and/or a salt thereof, and sulfuric acid and/or a salt thereof. Any appropriate salt may be employed as the salt. Examples of the salt include an alkali metal salt, an alkaline earth metal salt, an ammonium salt, and an organic ammonium salt. The pH adjustors may be used alone or in combination.

The use amount of the above-mentioned pH adjustor is as described in the above section <<1. Production method for polycarboxylic acid-based copolymer>>.

In the production of the copolymer composition for a cement admixture of the present invention, it is preferred that the above-mentioned monomer components be polymerized while the pH during polymerization is controlled to 3 or less in the presence of the pH adjustor including a nonpolymerizable organic sulfonic acid having a molecular weight of 300 or less and/or a salt thereof as an essential component. Meanwhile, the pH may be adjusted to any appropriate value after polymerization. In order to provide a high-performance cement admixture, the pH is preferably adjusted to 4 to 7 after polymerization.

The copolymer composition for a cement admixture of the present invention may contain any appropriate component in addition to the polycarboxylic acid-based copolymer and the nonpolymerizable organic sulfonic acid having a molecular weight of 300 or less and/or a salt thereof to in such a range that the effect of the present invention is not impaired.

The copolymer composition for a cement admixture of the present invention may be combined with any appropriate component as necessary to provide a cement admixture.

An example of the component which may be used in combination with the copolymer composition for a cement admixture of the present invention to provide a cement admixture includes a cement dispersing agent. When the cement dispersing agent is used, the blending mass ratio of the copolymer composition for a cement admixture of the present invention to the above-mentioned cement dispersing agent (the copolymer composition for a cement admixture of the present invention/the above-mentioned cement dispersing agent) varies depending on the kind of the above-mentioned cement dispersing agent to be used, the blending condition, the test condition, and the like, and hence cannot be unambiguously determined. However, the blending mass ratio is preferably 1 to 99/99 to 1, more preferably 5 to 95/95 to 5, or even more preferably 10 to 90/90 to 10 at a mass ratio (mass %) in terms of solids content. The cement dispersing agents may be used alone or in combination.

Examples of the above-mentioned cement dispersing agent include the cement dispersing agents described in the above section <<1. Production method for polycarboxylic acid-based copolymer>>.

Examples of the component which may be used in combination with the copolymer composition for a cement admixture of the present invention to provide a cement admixture include, in addition to the cement dispersing agent, cement additives (cement addition materials) such as a water-soluble polymer substance, a polymer emulsion, a hardening retarder, a high-early-strength agent/promoter, an antifoaming agent, an AE agent, a water-proofing agent, a rust preventive, a crack-reducing agent, an expanding agent, a cement-wetting agent, a thickener, a separation-reducing agent, a flocculant, a drying shrinkage-reducing agent, a strength enhancer, a self-leveling agent, a colorant, and a mildewcide.

The above-mentioned cement additives (cement addition materials) may be used alone or in combination.

The cement admixture resulting from the copolymer composition for a cement admixture of the present invention may be added to a cement composition such as cement paste, mortar, or concrete before use.

Any appropriate cement composition may be employed as the above-mentioned cement composition. Examples of the cement composition include cement compositions containing cement, water, an aggregate, and an antifoaming agent.

Any appropriate cement may be employed as the above-mentioned cement. Examples of the cement include the cement described in the above section <<1. Production method for polycarboxylic acid-based copolymer>>.

Any appropriate aggregate may be employed as the above-mentioned aggregate. Examples of the aggregate include the aggregates described in the above section <<1. Production method for polycarboxylic acid-based copolymer>>.

Any appropriate antifoaming agent may be employed as the above-mentioned antifoaming agent. Examples of the antifoaming agent include the antifoaming agents described in the paragraphs [0041] and [0042] in JP 3683176 B.

The blending amount and unit water content per $m^3$ of concrete in the above-mentioned cement composition are as described in the above section <<1. Production method for polycarboxylic acid-based copolymer>>.

The addition amount in the case of adding the above-mentioned cement admixture to the cement composition is as described in the above section <<1. Production method for polycarboxylic acid-based copolymer>>.

The above-mentioned cement composition may be prepared by blending the above-mentioned respective components by any appropriate method. An example of the method includes a method involving kneading in a mixer.

EXAMPLES

Hereinafter, the present invention is described in more detail by way of examples. However, the present invention is not limited to these examples. It should be noted that (a) part(s) and % in Examples are on a mass basis unless otherwise stated.

<Mass Average Molecular Weight>

Apparatus: Waters Alliance (2695)

Analysis soft: Empower professional+GPC option manufactured by Waters

Column: TSK gel guard column (having an inner diameter of 6.0×40 mm)+G4000SWXL+G3000SWXL+G2000SWXL (each having an inner diameter of 7.8×300 mm)

Detector: differential refractometer (RI) detector (Waters 2414) and multi-wavelength visible-ultraviolet (PDA) detector (Waters 2996)

Eluent: a mixed solution of acetonitrile/a sodium acetate (50 mM) solution in ion exchange water=40/60 (vol %) whose pH has been adjusted to 6.0 with addition of acetic acid Flow rate: 1.0 ml/min Column/detector temperature: 40° C.

Measurement time: 45 minutes

Sample solution injection amount: 100 μl (an eluent solution having a sample concentration of 0.5 mass %)

GPC standard samples: nine samples of polyethylene glycol Mp=272,500, 219,300, 107,000, 50,000, 24,000, 11,840, 6450, 4250, and 1470 manufactured by Tosoh Corporation were used.

Calibration curve: prepared with a cubic polynomial using Mp values of the above-mentioned polyethylene glycol <Concrete Test>

(1) Used Material

Cement: Taiheiyo Cement Corporation

Coarse aggregate: crushed stone produced in Ome

Fine aggregate: mountain sand produced in Mt. Ogasa/produced in Kimitsu, Chiba Prefecture (2) Unit Amount (kg/m$^3$)

W/C=52
s/a=49.0
Air=45.0
Water=166.0
Cement=320.0
Stone=942.0
Sand=846

(3) Used Mixer: Pacific Machinery & Engineering Co., Ltd., TM55 (a 55-L Forced-Mixing Pan-Type Mixer), Mixing Amount: 30 L (4) Test Method MA 202 (BASF Pozzolith Ltd.) as an AE agent was blended in an amount of 0.0015% with respect to cement. Fine aggregates and cement were loaded into a mixer and dry mixed for 10 seconds. Next, water containing a cement admixture and coarse aggregate were loaded and kneaded for 90 seconds. After that, concrete was discharged. The resultant concrete was measured for its slump value, slump flow value, and air amount in conformity of Japanese Industrial Standards (JIS A 1101, 1128, and 6204).

Example 1

To a reaction vessel made of glass and equipped with a temperature gauge, a stirrer, a dropping apparatus, a nitrogen-introducing tube, and a reflux condenser, 343.1 g of water, 857.12 g of an ethylene oxide (50 mol) adduct of 3-methyl-3-buten-1-ol (including 6.7 mass % of polyethylene glycol), and 30.89 g of a 15% p-toluenesulfonic acid monohydrate aqueous solution serving as a pH adjustor were loaded (pH=2.7, 21° C.). The inside of the reaction vessel was replaced with nitrogen under stirring. Under a nitrogen atmosphere, the temperature was increased to 58° C. Then, 37.9 g of a 2% hydrogen peroxide solution were charged. After the temperature had settled at 58° C., an aqueous solution obtained by dissolving 53.3 g of acrylic acid in 13.3 g of water was dropped over 3 hours. At the same time as the start of dropping of the acrylic acid aqueous solution, an aqueous solution obtained by dissolving 1.0 g of L-ascorbic acid and 1.9 g of 2-mercaptopropionic acid in 161.6 g of water was dropped over 3.5 hours. After that, the temperature was kept at 58° C. for additional 1 hour to complete a polymerization reaction. The pH was maintained at 3 or less during the polymerization reaction. Subsequently, the reaction mixture was cooled (pH=2.8, 21.4° C.) and then neutralized with a 30% NaOH aqueous solution so as to achieve pH=6.

The resultant copolymer composition (1) contained a copolymer (1P) and a nonpolymerizable organic sulfonic acid (salt) (1S). The GPC measurements of the copolymer (1P) revealed that the mass average molecular weight of a polymer excluding a peak corresponding to a monomer (Mw=2289) was 34,000 and the content of the polymer was 82.9%. Table 1 shows the results.

The resultant copolymer composition (1) was used for a cement admixture to carry out a concrete test. Table 2 shows the results.

Example 2

To a reaction vessel made of glass and equipped with a temperature gauge, a stirrer, a dropping apparatus, a nitrogen-introducing tube, and a reflux condenser, 339.9 g of water, 849.9 g of an ethylene oxide (50 mol) adduct of 3-methyl-3-buten-1-ol (including 6.7 mass % of polyethylene glycol), and 30.93 g of a 15% p-toluenesulfonic acid monohydrate aqueous solution serving as a pH adjustor were loaded (pH=2.7, 20° C.). The inside of the reaction vessel was replaced with nitrogen under stirring. Under a nitrogen atmosphere, the temperature was increased to 58° C. Then, 41.2 g of a 2% hydrogen peroxide solution were charged. After the temperature had settled at 58° C., an aqueous solution obtained by dissolving 60.5 g of acrylic acid in 15.1 g of water was dropped over 3 hours. At the same time as the start of dropping of the acrylic acid aqueous solution, an aqueous solution obtained by dissolving 1.1 g of L-ascorbic acid and 2.9 g of 2-mercaptopropionic acid in 159.2 g of water was dropped over 3.5 hours. After that, the temperature was kept at 58° C. for additional 1 hour to complete a polymerization reaction. The pH was maintained at 3 or less during the polymerization reaction. Subsequently, the reaction mixture was cooled (pH=2.7, 21.6° C.) and then neutralized with a 30% NaOH aqueous solution so as to achieve pH=6.

The resultant copolymer composition (2) contained a copolymer (2P) and a nonpolymerizable organic sulfonic acid (salt) (2S). The GPC measurements of the copolymer (2P) revealed that the mass average molecular weight of a polymer excluding a peak corresponding to a monomer (Mw=2289) was 37,000 and the content of the polymer was 84.3%. Table 1 shows the results.

The resultant copolymer composition (2) was used for a cement admixture to carry out a concrete test. Table 2 shows the results.

Example 3

To a reaction vessel made of glass and equipped with a temperature gauge, a stirrer, a dropping apparatus, a nitrogen-introducing tube, and a reflux condenser, 343.1 g of water, 829.7 g of an ethylene oxide (50 mol) adduct of 3-methyl-3-buten-1-ol (including 6.7 mass % of polyethylene glycol), and 31.2 g of a 15% p-toluenesulfonic acid monohydrate aqueous solution serving as a pH adjustor were loaded (pH=2.6, 21° C.). The inside of the reaction vessel was replaced with nitrogen under stirring. Under a nitrogen atmosphere, the temperature was increased to 58° C. Then, 50.4 g of a 2% hydrogen peroxide solution were charged. After the temperature had settled at 58° C., an aqueous solution obtained by dissolving 80.6 g of acrylic acid in 20.1 g of water was dropped over 3 hours. At the same time as the start of dropping of the acrylic acid aqueous solution, an aqueous solution obtained by dissolving 1.3 g of L-ascorbic acid and 2.7 g of 2-mercaptopropionic acid in 156.9 g of water was dropped over 3.5 hours. After that, the temperature was kept at 58° C. for additional 1 hour to complete a polymerization reaction. The pH was maintained at 3 or less during the polymerization reaction. Subsequently, the reaction mixture was cooled (pH=2.6, 26.0° C.) and then neutralized with a 30% NaOH aqueous solution so as to achieve pH=6.

The resultant copolymer composition (3) contained a copolymer (3P) and a nonpolymerizable organic sulfonic acid (salt) (3S). The GPC measurements of the copolymer (3P) revealed that the mass average molecular weight of a polymer excluding a peak corresponding to a monomer (Mw=2289) was 36,500 and the content of the polymer was 88.7%. Table 1 shows the results.

Example 4

To a reaction vessel made of glass and equipped with a temperature gauge, a stirrer, a dropping apparatus, a nitrogen-introducing tube, and a reflux condenser, 339.9 g of water, 849.9 g of an ethylene oxide (50 mol) adduct of 2-methyl-2-propen-1-ol, and 30.93 g of a 15% p-toluenesulfonic acid monohydrate aqueous solution serving as a pH adjustor were loaded (pH=2.4, 27° C.). The inside of the reaction vessel was replaced with nitrogen under stirring. Under a nitrogen atmosphere, the temperature was increased to 58° C. Then, 41.2 g of a 2% hydrogen peroxide solution were charged. After the temperature had settled at 58° C., an aqueous solution obtained by dissolving 60.5 g of acrylic acid in 15.1 g of water was dropped over 3 hours. At the same time as the start of dropping of the acrylic acid aqueous solution, an aqueous solution obtained by dissolving 1.1 g of L-ascorbic acid and 2.9 g of 2-mercaptopropionic acid in 159.2 g of water was dropped over 3.5 hours. After that, the temperature was kept at 58° C. for additional 1 hour to complete a polymerization reaction. The pH was maintained at 3 or less during the polymerization reaction. Subsequently, the reaction mixture was cooled (pH=2.7, 21° C.) and then neutralized with a 30% NaOH aqueous solution so as to achieve pH=6.

The resultant copolymer composition (4) contained a copolymer (4P) and a nonpolymerizable organic sulfonic acid (salt) (4S). The GPC measurements of the copolymer (4P) revealed that the mass average molecular weight of a polymer excluding a peak corresponding to a monomer (Mw=2274) was 36,500 and the content of the polymer was 83.7%. Table 1 shows the results.

Example 5

To a reaction vessel made of glass and equipped with a temperature gauge, a stirrer, a dropping apparatus, a nitrogen-introducing tube, and a reflux condenser, 294.1 g of water, 605.3 g of an ethylene oxide (50 mol) adduct of allyl alcohol (including 5.0 mass % of polyethylene glycol), and 30.0 g of a 15% p-toluenesulfonic acid monohydrate aqueous solution serving as a pH adjustor were loaded (pH=2.5, 27° C.). The inside of the reaction vessel was replaced with nitrogen under stirring. Under a nitrogen atmosphere, the temperature was increased to 58° C. Then, 39.0 g of a 2% hydrogen peroxide solution were charged. After the temperature had settled at 58° C., an aqueous solution obtained by dissolving 63.3 g of acrylic acid in 15.8 g of water was dropped over 3 hours. At the same time as the start of dropping of the acrylic acid aqueous solution, an aqueous solution obtained by dissolving 1.0 g of L-ascorbic acid and 2.2 g of 2-mercaptopropionic acid in 156.4 g of water was dropped over 3.5 hours. After that, the temperature was kept at 58° C. for additional 1 hour to complete a polymerization reaction. The pH was maintained at 3 or less during the polymerization reaction. Subsequently, the reaction mixture was cooled (pH=2.6, 21.4° C.) and then neutralized with a 30% NaOH aqueous solution so as to achieve pH=6.

The resultant copolymer composition (5) contained a copolymer (5P) and a nonpolymerizable organic sulfonic acid (salt) (5S). The GPC measurements of copolymer (5P) revealed that the mass average molecular weight of a polymer excluding a peak corresponding to a monomer (Mw=2260) was 37,500 and the content of the polymer was 67.8%. Table 1 shows the results.

Example 6

To a reaction vessel made of glass and equipped with a temperature gauge, a stirrer, a dropping apparatus, a nitrogen-introducing tube, and a reflux condenser, 343.1 g of water, 857.12 g of an ethylene oxide (50 mol) adduct of 3-methyl-3-buten-1-ol (including 6.7 mass % of polyethylene glycol), and 30.89 g of a 7.5% methanesulfonic acid aqueous solution serving as a pH adjustor were loaded (pH=2.5, 27° C.). The inside of the reaction vessel was replaced with nitrogen under stirring. Under a nitrogen atmosphere, the temperature was increased to 58° C. Then, 37.9 g of a 2% hydrogen peroxide solution were charged. After the temperature had settled at 58° C., an aqueous solution obtained by dissolving 53.3 g of acrylic acid in 13.3 g of water was dropped over 3 hours. At the same time as the start of dropping of the acrylic acid aqueous solution, an aqueous solution obtained by dissolving 1.0 g of L-ascorbic acid and 1.9 g of 2-mercaptopropionic acid in 161.6 g of water was dropped over 3.5 hours. After that, the temperature was kept at 58° C. for additional 1 hour to complete a polymerization reaction. The pH was maintained at 3 or less during the polymerization reaction. Subsequently, the reaction mixture was cooled (pH=2.7, 21.4° C.) and then neutralized with a 30% NaOH aqueous solution so as to achieve pH=6.

The resultant copolymer composition (6) contained a copolymer (6P) and a nonpolymerizable organic sulfonic acid (salt) (6S). The GPC measurements of the copolymer (6P) revealed that the mass average molecular weight of a polymer excluding a peak corresponding to a monomer (Mw=2289) was 34,500 and the content of the polymer was 82.5%. Table 1 shows the results.

Example 7

To a reaction vessel made of glass and equipped with a temperature gauge, a stirrer, a dropping apparatus, a nitrogen-introducing tube, and a reflux condenser, 58.7 g of water, 234.8 g of an ethylene oxide (150 mol) adduct of 2-methyl-2-propen-1-ol, and 11.0 g of a 15% p-toluenesulfonic acid monohydrate aqueous solution serving as a pH adjustor were loaded (pH=2.5, 27° C.). The inside of the reaction vessel was replaced with nitrogen under stirring. Under a nitrogen atmosphere, the temperature was increased to 58° C. Then, 16.8 g of a 2% hydrogen peroxide solution were charged. After the temperature had settled at 58° C., an aqueous solution obtained by dissolving 12.7 g of acrylic acid in 7.2 g of water was dropped over 3 hours. At the same time as the start of dropping of the acrylic acid aqueous solution, an aqueous solution obtained by dissolving 0.9 g of L-ascorbic acid and 0.8 g of 2-mercaptopropionic acid in 43.3 g of water was dropped over 3.5 hours. After that, the temperature was kept at 58° C. for additional 1 hour to complete a polymerization reaction. The pH was maintained at 3 or less during the polymerization reaction. Subsequently, the reaction mixture was cooled (pH=2.7, 20.5° C.) and then neutralized with a 30% NaOH aqueous solution so as to achieve pH=6.

The resultant copolymer composition (7) contained a copolymer (7P) and a nonpolymerizable organic sulfonic acid (salt) (7S). The GPC measurements of the copolymer (7P) revealed that the mass average molecular weight of a polymer excluding a peak corresponding to a monomer (Mw=6680) was 48,040 and the content of the polymer was 83.9%. Table 1 shows the results.

Comparative Example 1

To a reaction vessel made of glass and equipped with a temperature gauge, a stirrer, a dropping apparatus, a nitrogen-introducing tube, and a reflux condenser, 343.1 g of water and 857.12 g of an ethylene oxide (50 mol) adduct of 3-methyl-3-buten-1-ol (including 6.7 mass % of polyethylene glycol) were loaded (pH=7.4, 23° C.). The inside of the reaction vessel was replaced with nitrogen under stirring. Under a nitrogen atmosphere, the temperature was increased to 58° C. Then, 37.9 g of a 2% hydrogen peroxide solution were charged. After the temperature had settled at 58° C., an aqueous solution obtained by dissolving 53.3 g of acrylic acid in 13.3 g of water was dropped over 3 hours. At the same time as the start of dropping of the acrylic acid aqueous solution, an aqueous solution obtained by dissolving 1.0 g of L-ascorbic acid and 1.9 g of 2-mercaptopropionic acid in 161.6 g of water was dropped over 3.5 hours. After that, the temperature was kept at 58° C. for additional 1 hour to complete a polymerization reaction. The pH exceeded 3 during the polymerization reaction. Subsequently, the reaction mixture was cooled (pH=5.1, 21.4° C.) and then neutralized with a 30% NaOH aqueous solution so as to achieve pH=6.

The resultant copolymer composition (C1) contained a copolymer (C1P) but did not contain any nonpolymerizable organic sulfonic acid (salt). The GPC measurements of the copolymer (C1P) revealed that the mass average molecular weight of a polymer excluding a peak corresponding to a monomer (Mw=2289) was 34,000 and the content of the polymer was 74.7%. Table 1 shows the results.

The resultant copolymer composition (C1) was used for a cement admixture to carry out a concrete test. Table 2 shows the results.

Comparative Example 2

To a reaction vessel made of glass and equipped with a temperature gauge, a stirrer, a dropping apparatus, a nitrogen-introducing tube, and a reflux condenser, 339.9 g of water and 849.9 g of an ethylene oxide (50 mol) adduct of 3-methyl-3-buten-1-ol (including 6.7 mass % of polyethylene glycol) were loaded (pH=7.2, 28° C.). The inside of the reaction vessel was replaced with nitrogen under stirring. Under a nitrogen atmosphere, the temperature was increased to 58° C. Then, 41.2 g of a 2% hydrogen peroxide solution were charged. After the temperature had settled at 58° C., an aqueous solution obtained by dissolving 60.5 g of acrylic acid in 15.1 g of water was dropped over 3 hours. At the same time as the start of dropping of the acrylic acid aqueous solution, an aqueous solution obtained by dissolving 1.1 g of L-ascorbic acid and 2.9 g of 2-mercaptopropionic acid in 159.2 g of water was dropped over 3.5 hours. After that, the temperature was kept at 58° C. for additional 1 hour to complete a polymerization reaction. The pH exceeded 3 during the polymerization reaction. Subsequently, the reaction mixture was cooled (pH=5.0, 21.6° C.) and then neutralized with a 30% NaOH aqueous solution so as to achieve pH=6.

The resultant copolymer composition (C2) contained a copolymer (C2P) but did not contain any nonpolymerizable organic sulfonic acid (salt). The GPC measurements of the copolymer (C2P) revealed that the mass average molecular weight of a polymer excluding a peak corresponding to a monomer (Mw=2289) was 33,400 and the content of the polymer was 77.2%. Table 1 shows the results.

The resultant copolymer composition (C2) was used for a cement admixture to carry out a concrete test. Table 2 shows the results.

Comparative Example 3

To a reaction vessel made of glass and equipped with a temperature gauge, a stirrer, a dropping apparatus, a nitrogen-introducing tube, and a reflux condenser, 343.1 g of water and 829.7 g of an ethylene oxide (50 mol) adduct of 3-methyl-3-buten-1-ol (including 6.7 mass % of polyethylene glycol) were loaded (pH=7.3, 23° C.). The inside of the reaction vessel was replaced with nitrogen under stirring. Under a nitrogen atmosphere, the temperature was increased to 58° C. Then, 50.4 g of a 2% hydrogen peroxide solution were charged. After the temperature had settled at 58° C., an aqueous solution obtained by dissolving 80.6 g of acrylic acid in 20.1 g of water was dropped over 3 hours. At the same time as the start of dropping of the acrylic acid aqueous solution, an aqueous solution obtained by dissolving 1.3 g of L-ascorbic acid and 2.7 g of 2-mercaptopropionic acid in 156.9 g of water was dropped over 3.5 hours. After that, the temperature was kept at 58° C. for additional 1 hour to complete a polymerization reaction. The pH exceeded 3 during the polymerization reaction. Subsequently, the reaction mixture was cooled (pH=4.95, 26.0° C.) and then neutralized with a 30% NaOH aqueous solution so as to achieve pH=6.

The resultant copolymer composition (C3) contained a copolymer (C3P) but did not contain any nonpolymerizable organic sulfonic acid (salt). The GPC measurements of the copolymer (C3P) revealed that the mass average molecular weight of a polymer excluding a peak corresponding to a monomer (Mw=2289) was 36,000 and the content of the polymer was 81.9%. Table 1 shows the results.

The resultant copolymer composition (C3) was used for a cement admixture to carry out a concrete test. Table 2 shows the results.

Comparative Example 4

To a reaction vessel made of glass and equipped with a temperature gauge, a stirrer, a dropping apparatus, a nitrogen-introducing tube, and a reflux condenser, 339.9 g of water and 849.9 g of an ethylene oxide (50 mol) adduct of 2-methyl-2-propen-1-ol were loaded (pH=7.4, 21° C.). The inside of the reaction vessel was replaced with nitrogen under stirring. Under a nitrogen atmosphere, the temperature was increased to 58° C. Then, 41.2 g of a 2% hydrogen peroxide solution were charged. After the temperature had settled at 58° C., an aqueous solution obtained by dissolving 60.5 g of acrylic acid in 15.1 g of water was dropped over 3 hours. At the same time as the start of dropping of the acrylic acid aqueous solution, an aqueous solution obtained by dissolving 1.1 g of L-ascorbic acid and 2.9 g of 2-mercaptopropionic acid in 159.2 g of water was dropped over 3.5 hours. After that, the temperature was kept at 58° C. for additional 1 hour to complete a polymerization reaction. The pH exceeded 3 during the polymerization reaction. Subsequently, the reaction mixture was cooled (pH=4.95, 21.6° C.) and then neutralized with a 30% NaOH aqueous solution so as to achieve pH=6.

The resultant copolymer composition (C4) contained a copolymer (C4P) but did not contain any nonpolymerizable organic sulfonic acid (salt). The GPC measurements of the copolymer (C4P) revealed that the mass average molecular weight of a polymer excluding a peak corresponding to a monomer (Mw=2274) was 36,200 and the content of the polymer was 76.4%. Table 1 shows the results.

Comparative Example 5

To a reaction vessel made of glass and equipped with a temperature gauge, a stirrer, a dropping apparatus, a nitrogen-introducing tube, and a reflux condenser, 313.9 g of water, 608.4 g of an ethylene oxide (50 mol) adduct of allyl alcohol (including 5.0 mass % of polyethylene glycol), and 1.1 g of acrylic acid were loaded (pH=5.5, 27° C.). The inside of the reaction vessel was replaced with nitrogen under stirring. Under a nitrogen atmosphere, the temperature was increased to 58° C. After that, 39.6 g of a 2% hydrogen peroxide solution were charged. After the temperature had settled at 58° C., an aqueous solution obtained by dissolving 62.5 g of acrylic acid in 24.8 g of water was dropped over 3 hours. At the same time as the start of dropping of the acrylic acid aqueous solution, an aqueous solution obtained by dissolving 1.0 g of L-ascorbic acid and 2.2 g of 2-mercaptopropionic acid in 146.8 g of water was dropped over 3.5 hours. After that, the temperature was kept at 58° C. for additional 1 hour to complete a polymerization reaction. The pH exceeded 3 during the polymerization reaction. Subsequently, the reaction mixture was cooled (pH=5.0, 20.1° C.) and then neutralized with a 30% NaOH aqueous solution so as to achieve pH=6.

The resultant copolymer composition (C5) contained a copolymer (C5P) but did not contain any nonpolymerizable organic sulfonic acid (salt). The GPC measurements of the copolymer (C5P) revealed that the mass average molecular weight of a polymer excluding a peak corresponding to a monomer (Mw=2260) was 36,000 and the content of the polymers was 64.5%. Table 1 shows the results.

Comparative Example 6

To a reaction vessel made of glass and equipped with a temperature gauge, a stirrer, a dropping apparatus, a nitrogen-introducing tube, and a reflux condenser, 58.7 g of water, 234.8 g of an ethylene oxide (150 mol) adduct of 2-methyl-2-propen-1-ol, and 0.4 g of acrylic acid were loaded (pH=5.5, 27° C.). The inside of the reaction vessel was replaced with nitrogen under stirring. Under a nitrogen atmosphere, the temperature was increased to 58° C. Then, 18.0 g of a 2% hydrogen peroxide solution were charged. After the temperature had settled at 58° C., an aqueous solution obtained by dissolving 12.3 g of acrylic acid in 7.2 g of water was dropped over 3 hours. At the same time as the start of dropping of the acrylic acid aqueous solution, an aqueous solution obtained by dissolving 0.9 g of L-ascorbic acid and 0.7 g of 2-mercaptopropionic acid in 43.4 g of water was dropped over 3.5 hours. After that, the temperature was kept at 58° C. for additional 1 hour to complete a polymerization reaction. The pH exceeded 3 during the polymerization reaction. Subsequently, the reaction mixture was cooled (pH=5.0, 21.6° C.) and then neutralized with a 30% NaOH aqueous solution so as to achieve pH=6.

The resultant copolymer composition (C6) contained a copolymer (C6P) but did not contain any nonpolymerizable organic sulfonic acid (salt). The GPC measurements of the copolymer (C6P) revealed that the mass average molecular weight of a polymer excluding a peak corresponding to a monomer (Mw=6680) was 50,670 and the content of the polymer was 80.9%. Table 1 shows the results.

TABLE 1

| | Copolymer composition | Organic sulfonic acid (salt) (mass %)/ copolymer | Mass average molecular weight of polymer (Mw) | Content of polymer (%) |
|---|---|---|---|---|
| Example 1 | (1) | 0.5 | 34,000 | 82.9 |
| Example 2 | (2) | 0.5 | 37,000 | 84.3 |
| Example 3 | (3) | 0.5 | 36,500 | 88.7 |
| Example 4 | (4) | 0.5 | 36,500 | 83.7 |
| Example 5 | (5) | 0.5 | 37,500 | 67.8 |
| Example 6 | (6) | 0.5 | 34,500 | 82.5 |
| Example 7 | (7) | 0.7 | 48,040 | 83.9 |
| Comparative Example 1 | (C1) | 0 | 34,000 | 74.7 |
| Comparative Example 2 | (C2) | 0 | 33,400 | 77.2 |
| Comparative Example 3 | (C3) | 0 | 36,000 | 81.9 |
| Comparative Example 4 | (C4) | 0 | 36,200 | 76.4 |
| Comparative Example 5 | (C5) | 0 | 36,000 | 64.5 |
| Comparative Example 6 | (C6) | 0 | 50,670 | 80.9 |

TABLE 2

| | Copolymer composition | Acid content (mass %) | Addition amount (%/cement) | Flow value (mm) | Air amount (%) |
|---|---|---|---|---|---|
| Example 1 | (1) | 7.5 | 0.11 | 375 | 4.1 |
| Example 2 | (2) | 8.5 | 0.11 | 413 | 4 |
| Comparative Example 1 | (C1) | 7.5 | 0.11 | 343 | 4.1 |
| Comparative Example 2 | (C2) | 8.5 | 0.11 | 363 | 4.1 |
| Comparative Example 3 | (C3) | 8.5 | 0.115 | 375 | 4 |

The acid content in Table 2 is a numerical value of loaded acrylic acid in terms of sodium acrylate.

The results of Example 1 and Comparative Example 1 show that Example 1, in which the acid content of the polymer is identical and the polymer content is high, provides a large flow value as compared to Comparative Example 1. This reveals that the copolymer composition (1) obtained in Example 1 is high in fluidity in the case of being used for a cement admixture as compared to the copolymer composition (C1) obtained in Comparative Example 1.

The results in Example 2 and Comparative Examples 2 and 3 also show that Example 2, in which the acid content of the polymer is identical and the polymer content is high, provides a large flow value as compared to Comparative Examples 2 and 3. This reveals that the copolymer composition (2) obtained in Example 2 is high in fluidity in the case of being used for a cement admixture as compared to the copolymer compositions (C2) and (C3) obtained in Comparative Examples 2 and 3. This also reveals that the addition amount is decreased by 5% or more based on the flow values in Comparative Examples 2 and 3 and Example 2.

Industrial Applicability

The polycarboxylic acid-based copolymer obtained by the production method of the present invention is suitably used for a cement admixture. The cement admixture is suitably used for a cement composition such as cement paste, mortar, or concrete. The copolymer composition for a cement admixture of the present invention is suitably used for a cement admixture. The cement admixture is suitably used for a cement composition such as cement paste, mortar, or concrete.

The invention claimed is:

1. A production method for a polycarboxylic acid-based copolymer comprising:
polymerizing monomer components including an unsaturated polyalkene glycol ether based monomer (a) and an unsaturated monocarboxylic acid-based monomer (b) using a peroxide and a reductant as polymerization initiators in combination while a pH during polymerization is controlled to 3 or less in a presence of a pH adjustor; monomer (a) being represented by the general formula (1):

[Chem 1]

$$YO(TO)_m(R^1O)_nR^2 \qquad (1)$$

where: Y represents a 3-methyl-3-butenyl group; T represents an alkylene group having 1 to 5 carbon atoms or an aryl group having 6 to 9 carbon atoms; $R^1O$ represents one kind or two or more kinds of oxyalkylene groups having 2 to 18 carbon atoms; m represents 0 or 1; n represents an average addition mole number of the oxyalkylene groups and n represents 1 to 500; and $R^2$ represents a hydrogen atom or an alkyl group having 1 to 5 carbon atoms, and monomer (b) represented by the general formula (2):

[Chem 2]

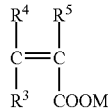
$$(2)$$

where: $R^3$, $R^4$, and $R^5$ are identical to or different from each other and each represent a hydrogen atom, or a methyl group; and M represents a hydrogen atom, a monovalent metal atom, a divalent metal atom, an ammonium group, or an organic amine group wherein the carboxylic acid-based copolymer comprises a structural unit (I) derived from monomer (a) and a structural unit (II) derived from monomer (b); and wherein the polycarboxylic acid-based copolymer does not include a structural unit derived from an unsaturated dicarboxylic acid-based monomer.

2. A production method according to claim 1, wherein the pH adjustor comprises an organic sulfonic acid and/or a salt thereof.

3. A production method according to claim 1, wherein the peroxide comprises hydrogen peroxide and the reductant comprises L-ascorbic acid.

4. A production method according to claim 1, wherein the copolymer comprises a copolymer for a cement admixture.

5. A copolymer composition for a cement admixture, comprising:
a polycarboxylic acid-based copolymer including:
a structural unit (I) derived from an unsaturated polyalkylene glycol ether-based monomer (a) represented by the general formula (1):

[Chem 3]

$$YO(TO)_m(R^1O)_nR^2 \qquad (1)$$

where: Y represents a 3-methyl-3-butenyl group; T represents an alkylene group having 1 to 5 carbon atoms or an aryl group having 6 to 9 carbon atoms; $R^1O$ represents one kind or two or more kinds of oxyalkylene groups having 2 to 18 carbon atoms; m represents 0 or 1; n represents an average addition mole number of the oxyalkylene groups and n represents 1 to 500;

and $R^2$ represents a hydrogen atom or an alkyl group having 1 to 5 carbon atoms; and a structural unit (II) derived from an unsaturated monocarboxylic acid-based monomer (b) represented by the general formula (2):

[Chem 4]

$$(2)$$

where: $R^3$, $R^4$, and $R^5$ are identical to or different from each other and each represent a hydrogen atom, a methyl group; and M represents a hydrogen atom, a monovalent metal atom, a divalent metal atom, an ammonium group, or an organic amine group; and a nonpolymerizable organic sulfonic acid having a molecular weight of 300 or less and/or a salt thereof, wherein the polycarboxylic acid-based copolymer does not include a structural unit derived from an insaturated diacarboxylic acid-based monomer.

6. A copolymer composition for a cement admixture according to claim 5, wherein the organic sulfonic acid comprises a compound represented by the general formula (3):

$$R^6-(Ph)_p-SO_3H \qquad (3)$$

where: $R^6$ represents a hydrogen atom or an alkyl group having 1 to 6 carbon atoms; Ph represents a phenylene group; and p represents 0 or 1.

7. A copolymer composition for a cement admixture according to claim 6, wherein the compound represented by the general formula (3) comprises a low molecular weight compound having a molecular weight of 250 or less.

8. A copolymer composition for a cement admixture according to claim 6, wherein $R^6$ in the general formula (3) represents an alkyl group having 1 or 2 carbon atoms.

9. A production method according to claim 2, wherein the peroxide comprises hydrogen peroxide and the reductant comprises L-ascorbic acid.

10. A production method according to claim 2, wherein the copolymer comprises a copolymer for a cement admixture.

11. A production method according to claim 3, wherein the copolymer comprises a copolymer for a cement admixture.

12. A copolymer composition for a cement admixture according to claim 7, wherein $R^6$ in the general formula (3) represents an alkyl group having 1 or 2 carbon atoms.

13. A production method according to claim 1, wherein m in general formula (1) is 1.

14. A copolymer composition for a cement admixture according to claim 5, wherein m in general formula (1) is 1.

\* \* \* \* \*